(12) United States Patent
DeLuca et al.

(10) Patent No.: US 10,579,686 B2
(45) Date of Patent: *Mar. 3, 2020

(54) ANALYZING AN INTERACTION HISTORY TO GENERATE A CUSTOMIZED WEBPAGE

(75) Inventors: Lisa S. DeLuca, San Francisco, CA (US); Steven M. Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1765 days.

This patent is subject to a terminal disclaimer.

(21) Appl. No.: 13/458,851

(22) Filed: Apr. 27, 2012

(65) Prior Publication Data

US 2012/0216109 A1 Aug. 23, 2012

Related U.S. Application Data

(63) Continuation of application No. 12/560,736, filed on Sep. 16, 2009, now Pat. No. 10,235,462.

(51) Int. Cl.
*G06F 3/048* (2013.01)
*G06F 16/9535* (2019.01)
*G06F 16/48* (2019.01)
*G06F 16/955* (2019.01)

(52) U.S. Cl.
CPC ........ *G06F 16/9535* (2019.01); *G06F 16/489* (2019.01); *G06F 16/955* (2019.01)

(58) Field of Classification Search
CPC ........ G06Q 10/04; G06Q 10/10; G06Q 30/06; G06Q 30/0601; G06Q 30/0641; G06Q 30/0201; G06Q 30/0202; G06Q 30/0207; G06Q 30/0277; G06F 17/227; G06F 17/30867; G06F 17/3087; G06F 17/30905; G06F 17/3089; H04M 1/72572; H04M 2250/60

See application file for complete search history.

(56) References Cited

U.S. PATENT DOCUMENTS

| 6,828,992 | B1 | 12/2004 | Freeman et al. | |
|---|---|---|---|---|
| 2002/0174230 | A1* | 11/2002 | Gudorf et al. | 709/227 |
| 2002/0180786 | A1 | 12/2002 | Tanner | |
| 2005/0021765 | A1* | 1/2005 | Flores et al. | 709/228 |

(Continued)

FOREIGN PATENT DOCUMENTS

| WO | 2008094712 A2 | 8/2008 |
|---|---|---|
| WO | 2009030568 A1 | 3/2009 |

OTHER PUBLICATIONS

"Scheduler| drupal.org", by TDobes, Sep. 28, 2003, archived by the Internet Wayback Machine Dec. 12, 2005, downloaded May 17, 2012 from http://web.archive.org/web/20051212044002/http://drupal.org/project/scheduler.*

(Continued)

*Primary Examiner* — Mohamed Abou El Seoud
(74) *Attorney, Agent, or Firm* — Patterson + Sheridan, LLP (57) ABSTRACT

Systems, methods and articles of manufacture are disclosed for generating a webpage. In one embodiment, a request may be received from a user to view the webpage that includes portlets. A time of the request may be identified. The portlets may be provided. Based on an interaction history of the user and the identified time of the request, the portlets may be arranged on the webpage. The webpage may be output for display, in response to the request.

20 Claims, 8 Drawing Sheets

(56) References Cited

U.S. PATENT DOCUMENTS

| | | | |
|---|---|---|---|
| 2005/0267789 A1 | 12/2005 | Satyadas et al. | |
| 2005/0267869 A1 | 12/2005 | Horvitz et al. | |
| 2006/0004913 A1 | 1/2006 | Chong | |
| 2006/0026557 A1 | 2/2006 | Petri | |
| 2006/0080612 A1* | 4/2006 | Hayes, Jr. | G06F 16/9577 715/742 |
| 2007/0083827 A1* | 4/2007 | Scott et al. | 715/811 |
| 2007/0136329 A1 | 6/2007 | Kussmaul et al. | |
| 2007/0204010 A1* | 8/2007 | Sah et al. | 709/219 |
| 2007/0226633 A1 | 9/2007 | Lyle et al. | |
| 2007/0282673 A1 | 12/2007 | Nagpal et al. | |
| 2008/0016116 A1 | 1/2008 | Tarr | |
| 2008/0046825 A1 | 2/2008 | Bedi et al. | |
| 2008/0086717 A1 | 4/2008 | Brunn et al. | |
| 2008/0092039 A1 | 4/2008 | Brockway et al. | |
| 2008/0120343 A1 | 5/2008 | Altrichter et al. | |
| 2008/0127133 A1 | 5/2008 | Aghara et al. | |
| 2008/0201645 A1 | 8/2008 | Francis et al. | |
| 2008/0243776 A1 | 10/2008 | Brunner et al. | |
| 2009/0158166 A1* | 6/2009 | Dewar et al. | 715/745 |
| 2009/0276716 A1* | 11/2009 | Chua | 715/744 |
| 2010/0293221 A1 | 11/2010 | Sidman et al. | |
| 2011/0066977 A1 | 3/2011 | DeLuca et al. | |

OTHER PUBLICATIONS

Osmond, M. et al, Adopting and Extending Portlet Technologies for e-Science Workflow Deployment, Sep. 2005, All Hands Meeting, Nottingham, United Kingdom.

International Search Report and Written Opinion for PCT Application Serial No. PCT/EP2010/062503 (SVL920090038PCT1) dated Feb. 25, 2011.

Anonymous: "IBM WebSphere Portal Version 6.1 reviewer's guide" Internet Publication—Software user manual, [Online] Aug. 2008 (Aug. 2008), pp. 1-56, XP002615655 IBM Retrieved from the Internet: <http://1.dell.com/sites/content/business/solutions/brochures/en/Documents/ibm_websphere_portal.pdf> [retrieved on Feb. 5, 2011] pp. 5, 12.

"GE-Fanuc-Proficy* Real-Time Information Portal", GE Fanuc Automation, retrieved Jul. 28, 2010: <http://softwaresolutions.fibre2fashion.com/productDetail.aspx?refno=3845>.

Rainer Dzierzon et al., "Performance Considerations for Custom Portal Code", IBM WebSphere Developer Technical Journal, Aug. 2005, retrieved Jul. 28, 2010: <http://www.ibm.com/developerworks/websphere/techjournal/0508_dzierzon/0508_dzierzon.html>.

"Wireless Customization Portal", Oracle Application Server Wireless Developer's Guide, 10g Release 2 (10.1.2), retrieved Jul. 28, 2010: <http://download.oracle.com/docs/cd/B14099_19/wireless.1012/b13819/cust.htm>.

"TimeMachine Computing: A timecentric Approach for the Information Environment" by Jun Rekimoto, 1999 ACM.

"Collaboration Trends 2006 to 2007", Trends, Aug. 16, 2006 by Erica Driver et al.

"Tomcat 6 HTTP log rolling and purging" StackExchange, Aug. 2, 2012 (StackExchange).

* cited by examiner

ANALYZING AN INTERACTION HISTORY TO GENERATE A CUSTOMIZED WEBPAGE

CROSS-REFERENCE TO RELATED APPLICATIONS

This application is a continuation of co-pending U.S. patent application Ser. No. 12/560,736, filed Sep. 16, 2009. The aforementioned related patent application is herein incorporated by reference in its entirety.

BACKGROUND

Field

Embodiments of the invention relate to portal environments. Specifically, embodiments of the invention relate to generating a webpage from previous browsing periods of a user.

Description of the Related Art

Distributing content in large computer networks often poses challenges. For example, the quantity of content available for distribution in a computer network often varies proportionally to the size of the computer network. For instance, the Internet hosts a vast quantity of content, not all of which is easily accessible by a typical end-user. Portals represent a sensible solution to the problem of aggregating content using a channel paradigm and at a single, network-addressable location. Consequently, portals have become increasingly used in content distribution.

Each page of a portal (or portal page) may include portlets. Each portlet is a fragment of markup code, such as Hypertext Markup Language (HTML) or Extensible Markup Language (XML), that may be generated by a corresponding portlet application. Each portlet application is a pluggable user interface software component that produces the fragment of markup code for the respective portlet of the portal page. The fragment may include content such as text, images, video, documents, spreadsheets, Weblogs, RSS or syndicated content feeds, or other reference objects like a uniform resource locator (URL). A prototypical portlet application may be implemented as server-side scripts executed by a portal server. Examples of portlet applications include email, weather reports, discussion forums, and news. Further, portlet standards, such as the Java™ Portlet Specification, allow software developers to create portlets that can be plugged in to any portal that supports the portlet standards.

From the perspective of an end-user, a portlet is a content channel to which the end-user can subscribe. From the perspective of a content provider, a portlet is a way to distribute content in a personalized manner to a subscribing end-user. By providing one or more individually selectable and configurable portlets in a portal, portal providers can distribute content and applications through a unified interface, in a personalized manner, and according to the preferences of the end-user.

SUMMARY

One embodiment of the invention includes a method for generating a webpage for display. The method may generally include receiving, from a user, a request to view the webpage comprising a plurality of portlets; identifying a time of the request; retrieving an interaction history of the user with at least one of the plurality of portlets; arranging the plurality of portlets on the webpage based on the interaction history and the identified time of the request, wherein the arranging is performed by operation of one or more computer processors; and outputting the webpage for display, responsive to the request.

Another embodiment of the invention includes a computer-readable storage medium containing a program which, when executed on a processor, performs an operation for generating a webpage for display. The operation may generally include receiving, from a user, a request to view the webpage comprising a plurality of portlets; identifying a time of the request; retrieving an interaction history of the user with at least one of the plurality of portlets; arranging the plurality of portlets on the webpage based on the interaction history and the identified time of the request, wherein the arranging is performed by operation of the processor; and outputting the webpage for display, responsive to the request.

Still another embodiment of the invention includes a system having one or more computer processors and a memory containing program, which when executed by the one or more computer processors is configured to perform an operation for generating a webpage for display. The operation may generally include receiving, from a user, a request to view the webpage comprising a plurality of portlets; identifying a time of the request; retrieving an interaction history of the user with at least one of the plurality of portlets; arranging the plurality of portlets on the webpage based on the interaction history and the identified time of the request, wherein the arranging is performed by operation of the one or more computer processors; and outputting the webpage for display, responsive to the request.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide techniques for generating a webpage from previous browsing periods of a user. Often, the user may interact with a portlet more frequently during a specific time of day. For example, a software engineer may often interact with a software documentation portlet, a search engine portlet, and a programming forum portlet during work hours on weekdays. During evenings and on weekends, however, the software engineer may instead interact with a local news portlet, an online shopping portlet, and a stock portfolio portlet. In one embodiment, an interaction history may record interactions between the user and the portlets. Further, one embodiment of the invention provides a software application (or simply, application). In response to a request for a webpage, the application may rearrange portlets on the webpage based on the interaction history and the time of the request for the webpage.

One example of a webpage is a portal page. As described above, each portlet of a portal page may be a fragment of markup code that is generated by a corresponding portlet application. As used herein, "portlets" refer generally to any fragments of markup code that, when rendered as part of a webpage: (i) occupy non-overlapping positions (relative to one another) on the webpage and (ii) may be rearranged (relative to one another) on the webpage by a user (while maintaining a non-overlapping property, relative to other portlets on the webpage). In one embodiment, the user may also remove a portlet from the webpage altogether.

Thus, embodiments of the invention may be adapted to support any webpage that has a visual appearance of a portal page (i.e., that includes rearrangeable, non-overlapping display elements that result from rendering, by a browser application, fragments of markup code). For example, a webpage may use asynchronous JavaScript and XML (Ajax) and Dynamic HTML (DHTML) to create rearrangeable, non-overlapping display elements on the webpage. As is known, Ajax refers to a set of client-side web technologies for communicating with a server asynchronously (i.e., without interfering with a current display or behavior of a webpage). As is known, DHTML refers to a set of client-side web technologies for creating interactive and/or animated webpages. Those skilled in the art will recognize that embodiments of the invention may be adapted to support any webpage that includes portlets, regardless of the underlying technology for generating the webpage (e.g., portal server, Ajax, etc.).

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1A:
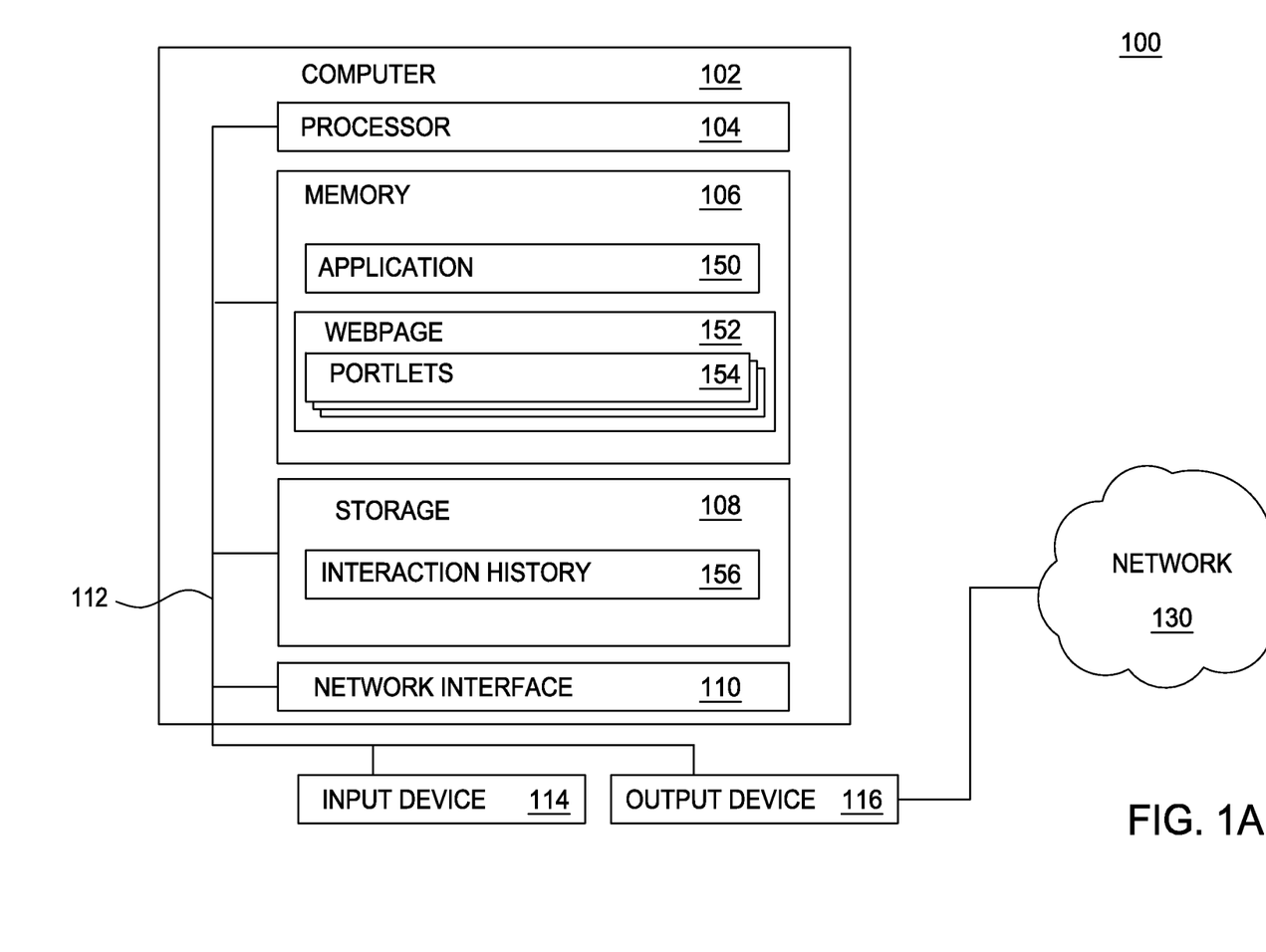
FIGS. 1A-1B are block diagrams illustrating a system for generating a webpage, according to one embodiment of the invention.

FIG. 1A is a block diagram illustrating a system 100 for generating a webpage, according to one embodiment of the invention. The system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes an application 150 and a webpage 152. The webpage 152 includes portlets 154. The storage 108 of the computer 102 includes an interaction history 156. FIGS. 2 through 6 and associated descriptions detail the structure and operation of the application 150 running on the computer 102.

A user may interact with a portlet more frequently during a specific time of day. For example, a software engineer may frequently interact with a to-do list portlet and an IP address portlet during work hours on weekdays. Interacting with a portlet includes providing any form of user input to the portlet. For example, a user may click on a hyperlink (or any other user interface element, such as a button) of a portlet. Further, a portlet may be associated with a website or webpage. For example, clicking on a product link from an online retailer portlet may open a new browser window displaying a product page for the product from the website of the online retailer.

Figure 2:
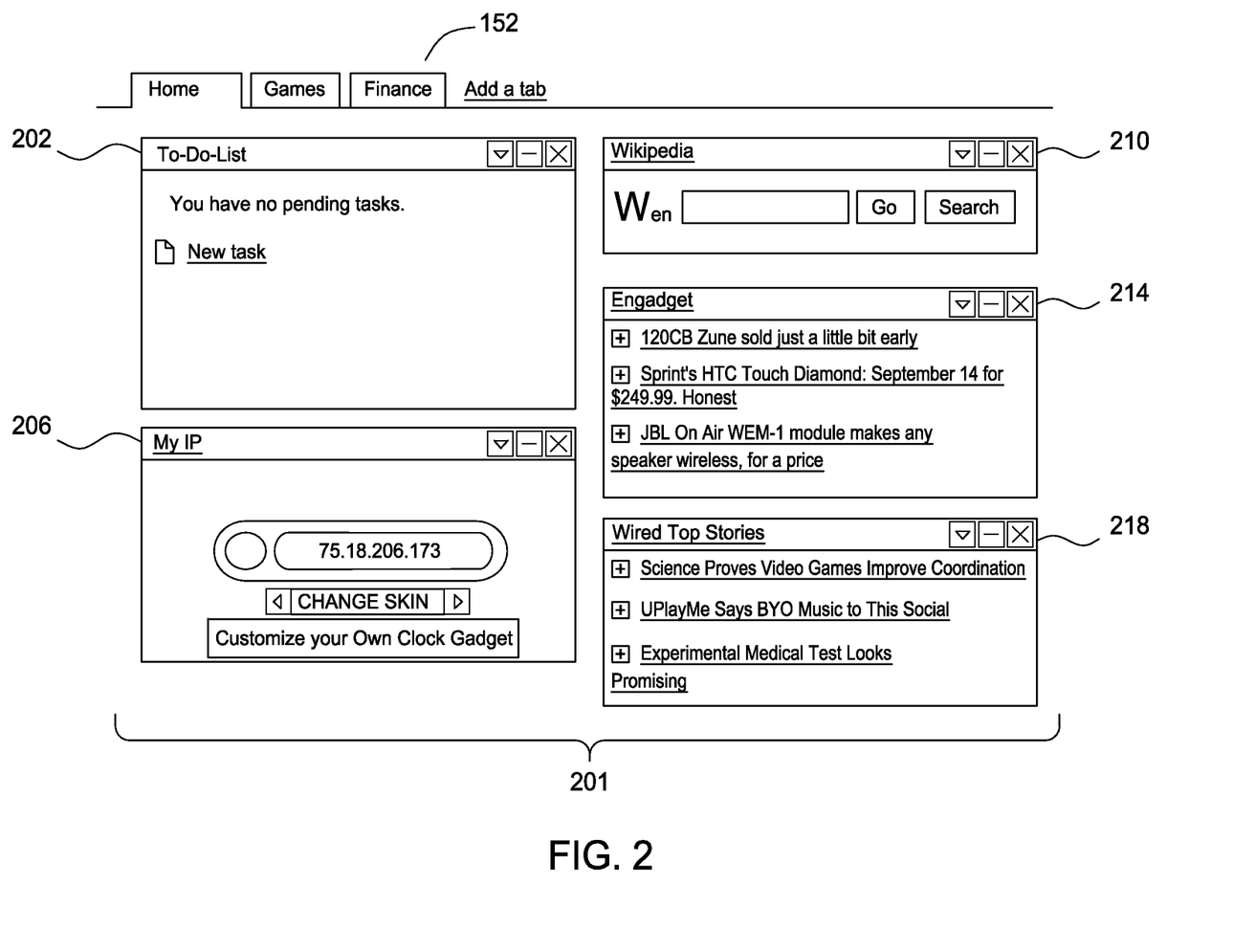
FIG. 2 illustrates an example of a webpage that includes portlets, according to one embodiment of the invention.

FIG. 2 illustrates an example 200 of a webpage that includes portlets, according to one embodiment of the invention. In this particular example, the webpage 152 includes portlets 201 that the user interacts with during work hours on weekdays. As shown, the portlets 201 include a to-do list portlet 202, an IP address portlet 206, an online encyclopedia portlet 210, a consumer electronics weblog portlet 214, and a technology magazine portlet 218.

Figure 3:
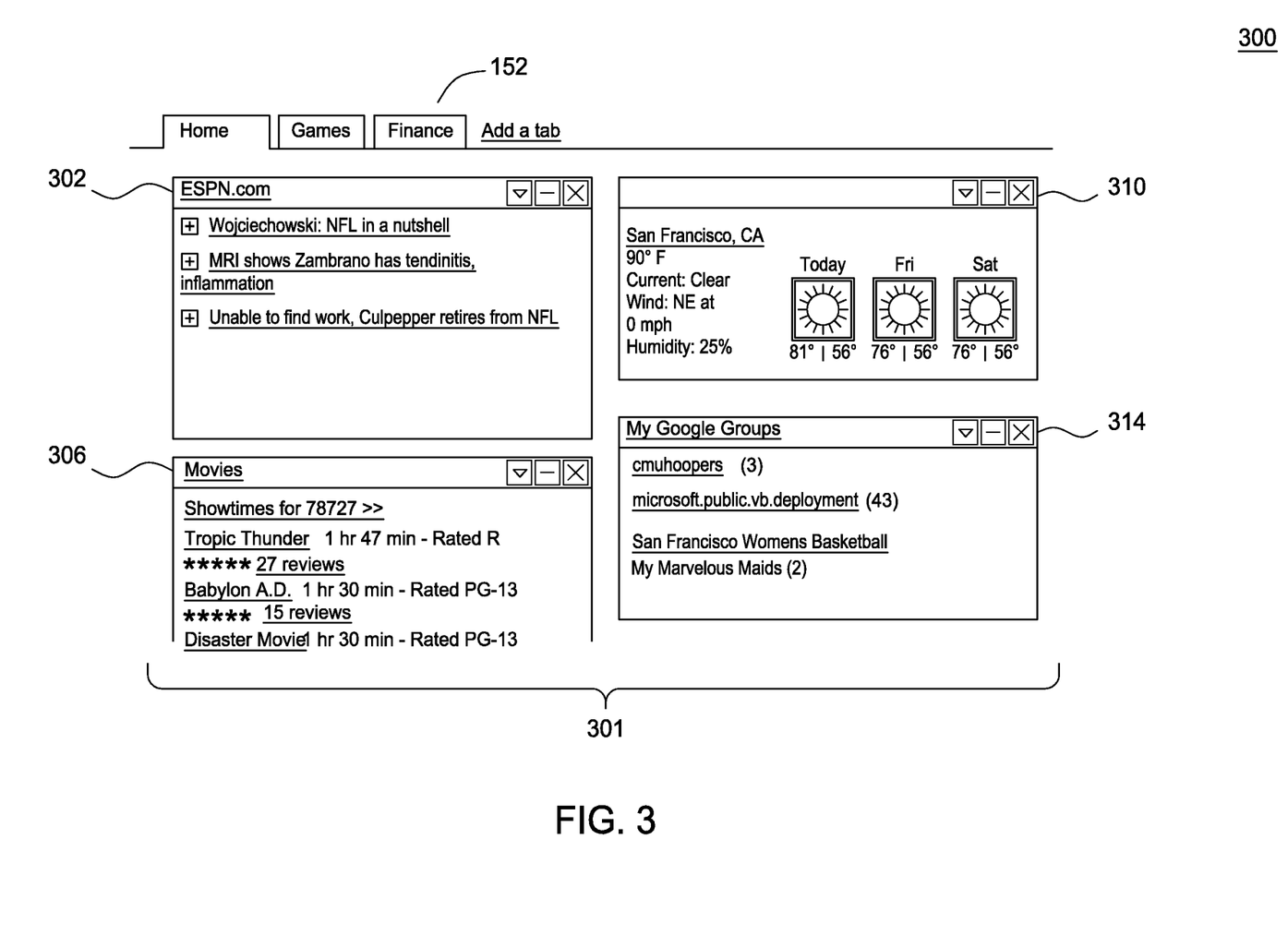
FIG. 3 illustrates another example of a webpage that includes portlets, according to one embodiment of the invention.

Continuing the above example, the software engineer may frequently interact with a sports news portlet and a movie review portlet during evenings and on weekends. FIG. 3 illustrates another example 300 of a webpage 152 of FIG. 1, according to one embodiment of the invention. In this particular example, the webpage 152 includes portlets 201 that the user interacts with during evenings and on weekends (i.e., in contrast to work hours on weekdays). As shown, the portlets 301 include a sports news portlet 302, a movie review portlet 306, a weather portlet 310, and a newsgroups portlet 314.

In one embodiment, the application 150 receives a request from a user to view a webpage including portlets. The application 150 may retrieve an interaction history for the user. The interaction history may record interactions between the user and the portlets. The interaction history may also record websites and/or webpages visited by the user (e.g., a browsing history of the user). Each website or webpage may be identified by a Uniform Resource Identifier (URI). As is known, a Uniform Resource Identifier (URI) includes a string of characters used to identify or name a resource on a network, such as the Internet. Further, a portlet may also be associated with a URI. For example, the online encyclopedia portlet may be associated with a URI "http://wikipedia.org/". Wikipedia® is a registered trademark of the Wikimedia Foundation, Inc., of San Francisco, Calif.

In one embodiment, the application 150 may identify a time of the request (e.g., 9:15 am). The application 150 may then determine a period of time that includes the time of the request (e.g., 9-10 am). The period of time may also include a day designation (e.g., daily, weekdays, weekends, Mondays, etc.). In one embodiment, the application 150 uses a day designation of "daily" by default. Further, a user may configure parameters for the period of time. For example, the user may specify a size of a time period (e.g., 1 hour, 2 hours, etc.), when a time period is to begin (e.g., 9 am), when a time period is to end (e.g., 11 am), etc. Those skilled in the art will recognize that the period of time may be tailored to suit the needs of a particular case. For example, the period of time may be a time of day, a day of week, a time of year, etc.

The application 150 may receive each portlet from a portlet application associated with the respective portlet, according to one embodiment. Further, the application 150 determines, from the period of time and from the interaction history, content most frequently accessed by the user for the period of time. The content may include websites and portlets, according to one embodiment. For example, if the period of time is 9-11 am daily, the application 150 may analyze the interaction history to determine which websites and/or portlets the user most frequently accessed during 9-11 am in all of the days covered by the interaction history. Suppose the time of the request is 9:15 am on Thursday, Feb. 5, 2009. Table I shows an example of an interaction history 156 retrieved by the application 150:

TABLE I

Interaction history example

| Type | URI or Portlet | Access time |
|---|---|---|
| Website | http://wikipedia.org/ | 2/5/2009 9:12am |
| Portlet | To-do list portlet | 2/5/2009 9:07am |
| Website | http://wikipedia.org/Data_mart | 2/4/2009 4:58pm |
| Website | http://wikipedia.org/Data_warehouse | 2/4/2009 4:53pm |
| Portlet | To-do list portlet | 2/4/2009 4:52pm |
| ... | ... | ... |

In this particular example, entries of the interaction history 156 are shown in reverse chronological order. The interaction history 156 indicates that the user accessed an online encyclopedia URI and the to-do list portlet on Feb. 5, 2009. The interaction history 156 also indicates that the user accessed the online encyclopedia and the to-do list portlet in the afternoon of Feb. 4, 2009.

The application 150 may tally, for each portlet of the webpage, the number of total interactions with the respective portlet and/or a corresponding website, according to one embodiment. In computing the tally, the application 150 may consider either all or part of the interaction history. For example, the application 150 may only consider the most recent two weeks of the interaction history 156, even if the interaction history 156 covers a one month period. Table I shows an example of tallying the number of interactions with a portlet or website:

TABLE II

Tallying the number of hits to a portlet and/or website
Time period: 9 am to 11 am daily over a two-week history

| Rank | Portlet | Associated URI | Total interactions |
|---|---|---|---|
| 1 | To-do list portlet | n/a | 95 |
| 2 | Online encyclopedia portlet | wikipedia.org | 72 |
| 3 | Weather portlet | wunderground.com | 30 |
| 4 | ... | ... | ... |

In this particular example, the application 150 determines, from the interaction history 156, that during 9-11 am daily over a two-week history: (i) the user accessed (or interacted with) the to-do list portlet ninety-five times; (ii) the user accessed the online encyclopedia portlet (or a corresponding URI) a total of seventy-two times; and (iii) the user accessed the weather portlet (or a corresponding URI) a total of thirty times. Accordingly, the application 150 may rank the portlets based on the tally. For example, the application 150 may assign the to-do list portlet a rank of one, representing the portlet most frequently accessed by the user based on the interaction history 156. Similarly, the application 150 may also assign a rank of two to the portlet next most frequently accessed by the user based on the interaction history 156, and so forth.

The application 150 may also rank the portlets 154 based on criteria other than (or in addition to) the interaction history 156, according to one embodiment. For example, the application 150 may rank an online shopping portlet higher if an online purchase history for the user indicates that the user frequently places orders during the time period (e.g., 9-11 am). Further, the application 150 may rank an online map portlet higher based on location information for the user (which may be determined from an Internet Protocol (IP) address, Global Positioning System (GPS) information, etc.). Further still, the application 150 may rank a portlet of a customer higher if calendar entries for the user indicate that the user is soon to attend a meeting with the customer. Of course, those skilled in the art will recognize that the specific way in which the application 150 ranks portlets based on location information or calendar entries may be tailored to fit the needs of a particular case.

The application 150 may arrange the portlets 154 on the webpage 152 based on the ranking, according to one embodiment. For example, the application 150 may arrange higher-ranked portlets (e.g., the to-do list portlet) to appear above lower-ranked portlets (e.g., the movie review portlet) on the webpage 152. Further, the application 150 may also exclude a portlet 154 from being displayed. For example, the application 150 may exclude any portlet that is ranked beyond a predefined threshold (e.g. having a poor rank, such as rank eight or below). In one embodiment, the application 150 may be a portal server application that outputs a webpage (with arranged portlets) to a client browser application. In another embodiment, the application 150 may be a client browser application that re-arranges portlets on a webpage when rendering the webpage. Other embodiments are broadly contemplated. For example, the interaction history 156 may be stored on a computer executing a client browser application and/or a computer running the portal server application.

Figure 1B:
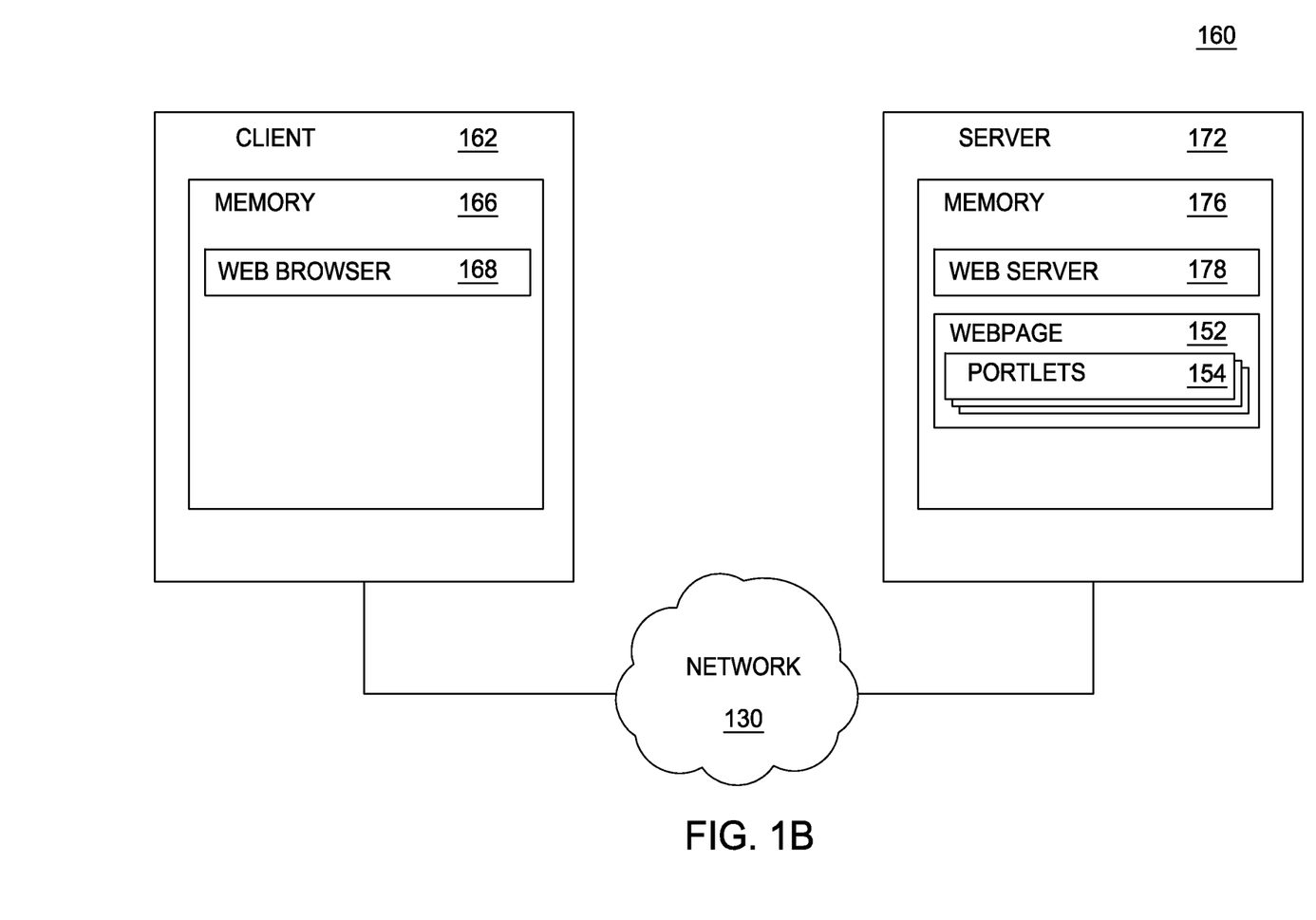

FIG. 1B is a block diagram illustrating a networked system 160 for generating a webpage, according to one embodiment of the invention. The networked system 160 corresponds to the system 100 of FIG. 1A. As shown, the networked system 160 includes a client 162 that is connected to a server 172 via the network 130. The client 162 includes a memory 166. Further, the memory 166 of the client 162 includes a web browser 168. The server 172 includes a memory 176. Further, the memory 176 of the server 172 includes a web server 178 and the webpage 152. An example of a web server 178 is a portal server.

In one embodiment, the web server 178 generates the webpage 152, which includes portlets 154. The web server 178 sends the webpage 152 to the web browser 168. As described above, in one embodiment, the application 150 may be the web server 178. That is, the application 150 arranges the portlets 154 in generating the webpage 152. The application 150 may then send the webpage 152 (with the arranged portlets) to the web browser 168. In another embodiment, the application 150 may be the web browser 168. That is, the application 150 receives the webpage 152 from the web server 178. The application 150 then rearranges the portlets 154 in rendering the webpage 152.

Figure 4:
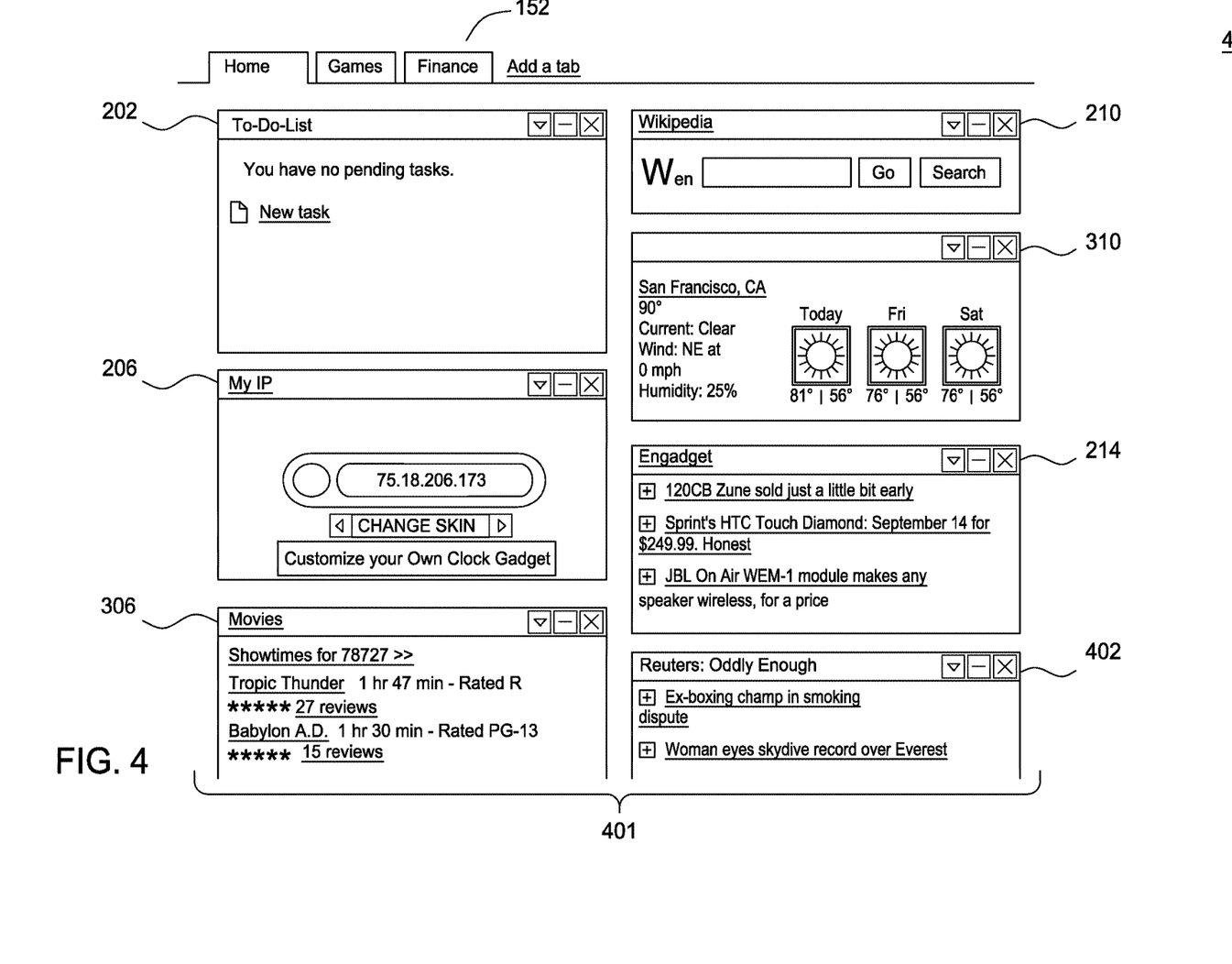
FIG. 4 illustrates an example of a webpage with rearranged portlets, according to one embodiment of the invention.

FIG. 4 illustrates an example 400 of a webpage 152 with rearranged portlets, according to one embodiment of the invention. In this particular example, the webpage 152 includes portlets 401. The portlets 401 include the to-do list portlet 202, the IP address portlet 206, the movie review portlet 306, the online encyclopedia portlet 210, the weather portlet 310, the consumer electronics weblog portlet 214, and a "strange but true" news portlet 402. Further, the portlets 401 are arranged according to how frequently the user interacts with each portlet (and/or accesses a corresponding website of the respective portlet) for a specific time period corresponding to the time of the request for the webpage 152. For example, the to-do list portlet 202, the online encyclopedia portlet 210, and the weather portlet 206 are the most-highly ranked portlets of Table II (based on the interaction history 156). Accordingly, the to-do list portlet 202, the online encyclopedia portlet 210, and the weather portlet 206 are arranged to appear, in the webpage 152, above the movie review portlet 306, the weather portlet 310, the consumer electronics weblog portlet 214, and the "strange but true" news portlet 402.

Figure 5:
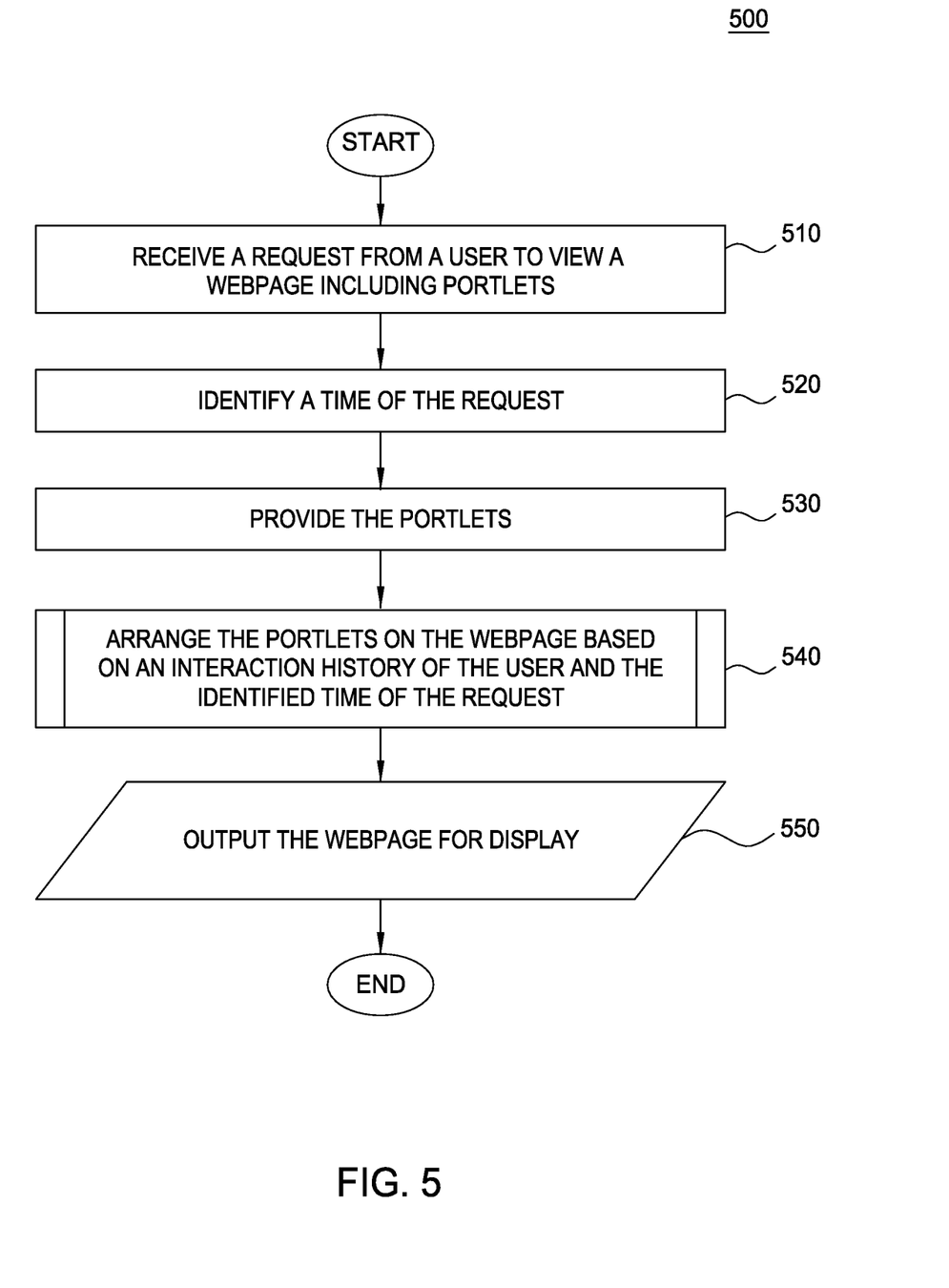
FIG. 5 is a flowchart depicting a method for generating a webpage, according to one embodiment of the invention.

FIG. 5 is a flowchart depicting a method 500 for generating the webpage 152 of FIG. 1, according to one embodiment of the invention. As shown, the method 500 begins at step 510, where the application 150 receives a request from a user to view the webpage 152 that includes portlets 154. At step 520, the application 150 identifies a time of the request (e.g., 9:15 am). At step 530, the application 150 provides the portlets 154. For example, the application 150 may receive each portlet from a portlet application associated with the respective portlet. At step 540, the application 150 arranges the portlets 154 on the webpage 152 based on an interaction history 156 of the user and the identified time of the request. Table I shows an example of the interaction history 156. The step 540 is further described below (in conjunction with FIG. 6). At step 550, the application 150 outputs the webpage 152 for display. FIG. 4 shows an example of the webpage 152. After the step 550, the method 500 terminates.

Figure 6:
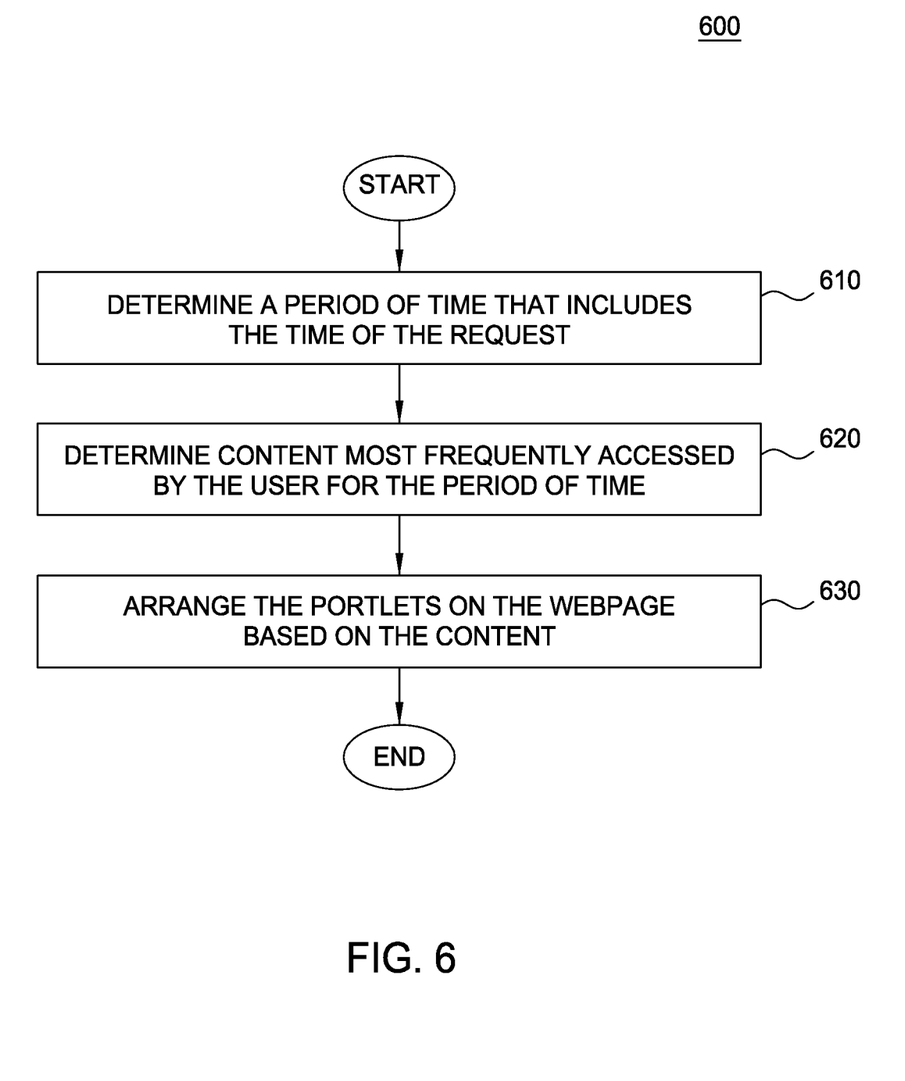
FIG. 6 is a flowchart depicting a method for arranging portlets on a webpage, according to one embodiment of the invention.

FIG. 6 is a flowchart depicting a method 600 for arranging portlets 154 on the webpage 152 of FIG. 1, according to one embodiment of the invention. Further, the method 600 corresponds to the step 540 of FIG. 5. As shown, the method 600 begins at step 610, where the application 150 determines a period of time that includes the time of the request. At step 620, the application 150 determines, based on the interaction history 156, content most frequently accessed by the user for the period of time. Table II shows an example of content most frequently accessed by the user. At step 630, the application 150 may arrange the portlets 154 on the webpage 152 based on the determined content. For example, portlets 154 more frequently accessed may be arranged to appear, in the webpage 152, above portlets 152 less frequently accessed. After the step 630, the method 600 terminates.

Figure 7:
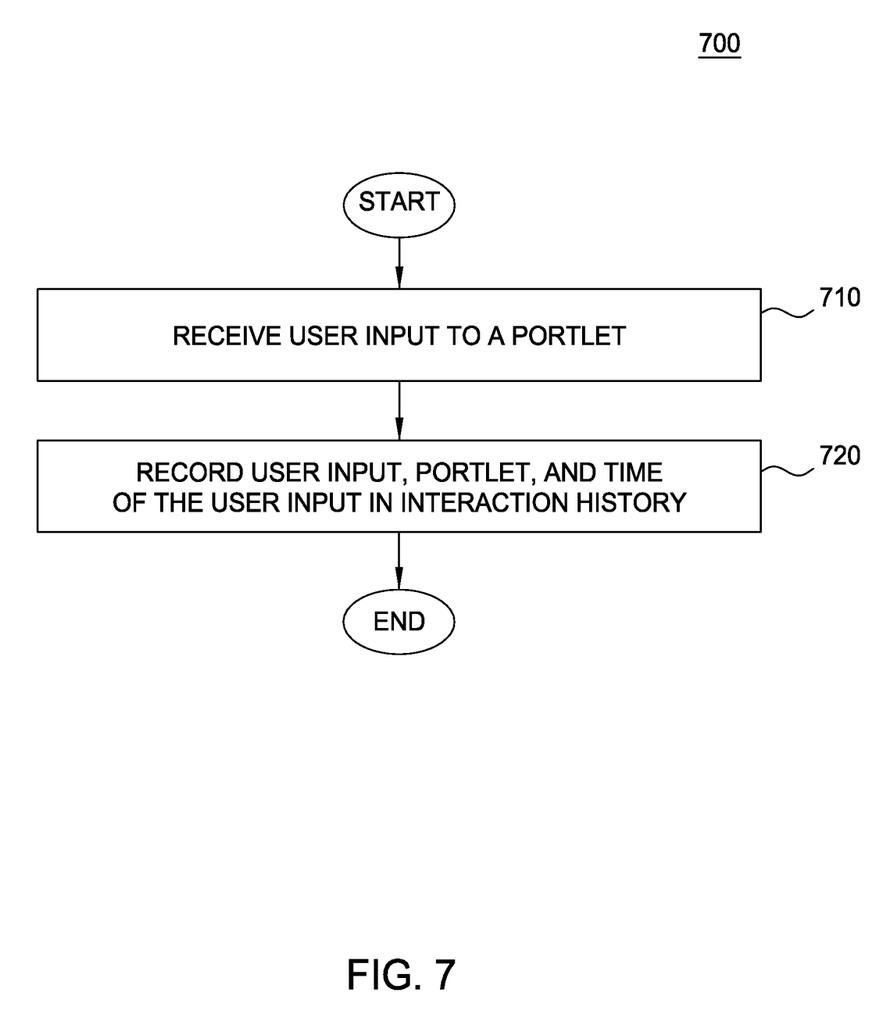
FIG. 7 is a flowchart depicting a method for recording an interaction history between a user and portlets of a webpage, according to one embodiment of the invention.

FIG. 7 is a flowchart depicting a method 700 for recording an interaction history between a user and portlets of a webpage, according to one embodiment of the invention. As shown, the method 700 begins at step 710, where the application 150 receives user input to a portlet 154. For example, a user may click on a hyperlink or a button contained inside a portlet 154. At step 720, the application 150 records the user input, the portlet 154, and/or the time of the user input in the interaction history 156. For example, the application 150 may store an entry of Table I. After the step 720, the method 700 terminates.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Other embodiments of the invention are broadly contemplated. For example, the application 150 may arrange portlets into multiple tabs (e.g., a first tab for work, a second tab for home, etc.) within a webpage. Each tab may correspond to a time period during which the user exhibits a pattern (specific to the time period) of accessing portlets and/or websites. Portlets not satisfying a minimum threshold ranking for a time period (according to the interaction history 156) may be excluded from display in the tab corresponding to the time period. Further, a user may specify one or more portlets as "preferred." Specifying a portlet as "preferred" may increase the ranking of the portlet (as determined by the application 150). For example, a user may specify a Clock portlet as preferred. The application 150 may arrange the Clock portlet near the top of the page, even if the interaction history indicates no (or little) interaction between the user and the Clock portlet.

Advantageously, embodiments of the invention provide an application configured to generate a webpage. In one embodiment, the application may receive a request from a user to view the webpage that includes portlets. The application may identify a time of the request. Further, the application may provide the portlets. Based on an interaction history of the user and the identified time of the request, the application may arrange the portlets on the webpage. For example, portlets more frequently accessed during previous browsing periods of the user may be arranged to appear above portlets less frequently accessed by the user. The application may output the webpage for display.

While the foregoing is directed to embodiments of the present invention, other and further embodiments of the invention may be devised without departing from the basic scope thereof, and the scope thereof is determined by the claims that follow.

What is claimed is:

1. A computer-implemented method for generating a first webpage for display, the computer-implemented method comprising:

receiving, from a user, a request to view the first webpage comprising a plurality of portlets, wherein one or more websites are associated with a portlet of the plurality of portlets;

identifying a time of the request;

retrieving a browsing history of the user and an interaction history of the user with at least one of the plurality of portlets, wherein the browsing history of the user is different from the interaction history of the user, wherein the browsing history specifies a set of visited websites and webpages aside from the first webpage, wherein the set of visited websites and webpages is independent of any interaction between the user and the portlets, wherein the interaction history specifies a set of instances including an instance of activating a portlet hyperlink, an instance of receiving user input, and an instance of activating a portlet button, wherein the user specifies a desired time duration into which the interaction history and the browsing history are divided, to form a plurality of distinct time periods to be matched with the time period of the request from the user, wherein each of the interaction history and the browsing history is qualified by the time period matching that of the request from the user;

generating a respective set of metrics for each distinct time period, based on respective portions of the interaction history and of the browsing history, that match the respective time period, wherein each set of metrics include an access frequency metric qualified by at least one of the respective portlet and the associated website and qualified further by the respective time period, wherein the set of metrics for at least a first time period of the plurality of distinct time periods includes a composite access frequency that is a sum of an access frequency of a portlet of the plurality of portlets and an access frequency of a website associated with the portlet;

arranging the plurality of portlets on the first webpage by operation of one or more computer processors and based on the browsing history, the interaction history, the identified time of the request, and a set of calendar entries including a customer meeting entry associated with at least one portlet of the plurality of portlets, wherein the plurality of portlets is arranged into a plurality of tabs of the first webpage, each tab having at least two portlets, wherein each tab is associated with a respective, distinct time period of the plurality of time periods; and outputting the first webpage for display, responsive to the request.

2. The computer-implemented method of claim 1, wherein arranging the plurality of portlets on the first webpage comprises:

determining a period of time that includes the time of the request;

determining, from the retrieved interaction history, content most frequently accessed by the user for the determined period of time; and arranging the plurality of portlets on the first webpage based on the determined content.

3. The computer-implemented method of claim 2, wherein the period of time is selected from at least one of: (i) a time of day; (ii) a day of week; and (iii) a time of year.

4. The computer-implemented method of claim 1, wherein arranging the plurality of portlets on the first webpage comprises excluding at least one of the plurality of portlets from display on the first webpage.

5. The computer-implemented method of claim 1, wherein the plurality of portlets is further arranged based on a purchasing history of the user.

6. The computer-implemented method of claim 1, wherein the plurality of portlets is further arranged based on a location of the user.

7. The computer-implemented method of claim 1, wherein the plurality of portlets is arranged based on the customer meeting entry and based further on an indication from the user that specifies to prioritize placement of one or more portlets of the plurality of portlets, wherein the plurality of portlets are arranged by a web application, wherein arranging the plurality of portlets on the first webpage comprises:

determining a period of time that includes the time of the request;

determining, from the retrieved interaction history, content most frequently accessed by the user during the determined period of time; and arranging the plurality of portlets on the first webpage based on the determined content.

8. The computer-implemented method of claim 7, wherein the web application is configured to determine, from the retrieved interaction history, content most frequently accessed by the user, qualified by each period of time selected from: (i) a time of day; (ii) a day of week; and (iii) a time of year.

9. The computer-implemented method of claim 8, wherein at least one of the plurality of portlets is associated with a Uniform Resource Indicator (URI), wherein the web application is configured to determine each content selected from: (i) the at least one portlet and (ii) the URI associated with the at least one portlet.

10. The computer-implemented method of claim 9, wherein the plurality of portlets is arranged based further on: (i) a purchasing history of the user and (ii) a location of the user; wherein at least one of the plurality of portlets is excluded from display on the first webpage.

11. The computer-implemented method of claim 10, wherein the plurality of portlets includes a news portlet, a weather portlet, a clock portlet, a to-do list portlet, an encyclopedia portlet, a network address portlet, a weblog portlet, a newsgroup portlet, an online shopping portlet, a stock portfolio portlet, and a movie review portlet, and a magazine portlet.

12. The computer-implemented method of claim 1, wherein the plurality of portlets is arranged based further on at least one of: (i) a purchasing history of the user and (ii) a location of the user.

13. The computer-implemented method of claim 1, wherein the plurality of portlets is arranged based further on: (i) a purchasing history of the user and (ii) a location of the user.

14. The computer-implemented method of claim 1, wherein arranging the plurality of portlets on the first webpage comprises:

determining a period of time that includes the time of the request, wherein the time period comprises a time of day;

determining, from the retrieved interaction history, content most frequently accessed by the user for the determined period of time; and arranging the plurality of portlets on the first webpage based on the determined content.

15. The computer-implemented method of claim 1, wherein arranging the plurality of portlets on the first webpage comprises:

determining a period of time that includes the time of the request, wherein the time period comprises a day of week;

determining, from the retrieved interaction history, content most frequently accessed by the user for the determined period of time; and arranging the plurality of portlets on the first webpage based on the determined content.

16. The computer-implemented method of claim 1, wherein arranging the plurality of portlets on the first webpage comprises:

determining a period of time that includes the time of the request, wherein the time period comprises a time of year;

determining, from the retrieved interaction history, content most frequently accessed by the user for the determined period of time; and arranging the plurality of portlets on the first webpage based on the determined content.

17. The computer-implemented method of claim 1, wherein the plurality of portlets includes at least one of a news portlet, a weather portlet, a clock portlet, a to-do list portlet, an encyclopedia portlet, a network address portlet, a weblog portlet, a newsgroup portlet, an online shopping portlet, a stock portfolio portlet, and a movie review portlet, and a magazine portlet.

18. The computer-implemented method of claim 1, wherein the plurality of portlets includes at least two of a news portlet, a weather portlet, a clock portlet, a to-do list portlet, an encyclopedia portlet, a network address portlet, a weblog portlet, a newsgroup portlet, an online shopping portlet, a stock portfolio portlet, and a movie review portlet, and a magazine portlet.

19. The computer-implemented method of claim 1, wherein the plurality of portlets includes at least three of a news portlet, a weather portlet, a clock portlet, a to-do list portlet, an encyclopedia portlet, a network address portlet, a weblog portlet, a newsgroup portlet, an online shopping portlet, a stock portfolio portlet, and a movie review portlet, and a magazine portlet.

20. The computer-implemented method of claim 1, wherein the plurality of portlets includes a news portlet, a weather portlet, a clock portlet, a to-do list portlet, an encyclopedia portlet, a network address portlet, a weblog portlet, a newsgroup portlet, an online shopping portlet, a stock portfolio portlet, and a movie review portlet, and a magazine portlet.

* * * * *